United States Patent
Pollman

(10) Patent No.: US 7,354,368 B2
(45) Date of Patent: Apr. 8, 2008

(54) METHOD AND MEANS FOR SHIFTING A HYDROMECHANICAL TRANSMISSION

(75) Inventor: Frederic W Pollman, Eden Prairie, MN (US)

(73) Assignee: Sauer-Danfoss Inc., Ames, IA (US)

( * ) Notice: Subject to any disclaimer, the term of this patent is extended or adjusted under 35 U.S.C. 154(b) by 340 days.

(21) Appl. No.: 11/047,541

(22) Filed: Jan. 31, 2005

(65) Prior Publication Data

US 2006/0172854 A1   Aug. 3, 2006

(51) Int. Cl.
*F16H 47/04* (2006.01)
(52) U.S. Cl. .......................... 475/72; 475/73; 475/76; 475/78
(58) Field of Classification Search .................. 477/52, 477/68, 69; 475/72, 73, 76, 78, 83
See application file for complete search history.

(56) References Cited

U.S. PATENT DOCUMENTS

| | | | |
|---|---|---|---|
| 3,969,958 A * | 7/1976 | Miyao et al. ................. | 475/82 |
| 4,354,400 A | 10/1982 | Baker | |
| 5,071,391 A | 12/1991 | Kita | |
| 6,272,950 B1 * | 8/2001 | Braun et al. ................. | 74/731.1 |
| 6,918,850 B2 * | 7/2005 | Hasegawa et al. ........... | 475/72 |
| 2001/0029218 A1 * | 10/2001 | Cronin et al. ................. | 475/78 |
| 2004/0209718 A1 * | 10/2004 | Ishibashi et al. ............. | 474/18 |
| 2005/0059521 A1 * | 3/2005 | Funato et al. ................. | 475/73 |
| 2006/0217225 A1 * | 9/2006 | Hiraki et al. ................. | 475/72 |

* cited by examiner

Primary Examiner—Sherry Estremsky

(57) ABSTRACT

A method for achieving high quality shifts with one hydraulic unit near zero displacement when using dog clutches. This method includes selecting the proper displacement and vocation (whether the hydrostatic unit works as a pump or motor) of a low displacement hydraulic unit during the shift, selecting the appropriate speed differential between the clutch elements, selecting the proper vehicle speed at which to make the shift, and sequencing the displacement changes of the hydraulic units with a controller in order to achieve the desired shift conditions.

16 Claims, 9 Drawing Sheets

METHOD AND MEANS FOR SHIFTING A HYDROMECHANICAL TRANSMISSION

BACKGROUND OF THE INVENTION

This invention relates to hydromechanical transmissions. More specifically, this invention relates to a method of shifting modes within a hydromechanical transmission.

Hydromechanical transmissions are frequently used in vehicles where shift quality is important and more specifically shift smoothness and continuous power delivery is important within the transmission. Within the hydromechanical transmission are a series of gears that make up separate modes within the transmission, usually a first mode for low speed and a second mode for high speed. These mode changes are usually made with a clutching element and are preferably made without a change in the transmission ratio by engaging the incoming clutch when the first and second modes are at near synchronous speeds.

For efficient space utilization, dog clutches have been used to accomplish this shift. A dog clutch may be used if the clutch element speed differential is low enough and the clutch torque direction and magnitude is satisfactory. On occasions, a clutch element synchronizer can be used to assist in achieving the satisfactory speed differential. Unfortunately, synchronizers have limited maximum torque capacity and also require torque to drop below a threshold to complete the shift.

Presently, in hydromechanical transmissions, during the shift there is a period of time when a first clutch element disengages from the first mode and the second clutch element has yet to engage the second mode. During this time, the speed of the transmission elements will drift in a direction of reducing torque. Consequently, when a shift is made with one of the hydrostatic units at or near zero displacement, there is not active control of this unit's speed. Therefore, the hydrostatic unit speed can either increase or decrease depending on whether the unit was acting as a pump or a motor prior to the initial shift. Conversely, there is little effect on the transmission function when a zero displacement unit changes speed in order to accomplish shifts. Consequently, when using dog clutches, a shift method must be used which accounts for the location of the hydraulic units.

Though advances have been made in the hydromechanical transmission art, problems still remain. When one of the hydraulic units is near zero displacement, the other is near zero speed. Thus, for the low speed unit it takes a relatively large change in displacement to produce a corresponding change in flow. Consequently, both low displacement and speed can cause tolerance and gain issues that interfere with achieving the desired speed and torque conditions necessary for a proper shift. Consequently there is a need in the art to develop a shifting method that will improve the shifting quality in a hydromechanical transmission in the presence of these tolerance and gain issues.

Therefore, it is a principal object of the present invention to achieve higher quality shifts within a hydromechanical transmission.

Another object of the present invention is to provide for a method of shifting that occurs in or near a torque dead zone of a hydromechanical transmission.

Yet another object of the present invention is to utilize dog clutches to improve the shifting process.

Another object of the present invention is to provide an active control of the hydrostatic units during the shifting process.

Yet another object of the present invention is to utilize an electronic controller that measures a plurality of variables in order to improve shifting quality.

These and other objects, features, or advantages of the present invention will become apparent from the specification and claims.

BRIEF SUMMARY OF THE INVENTION

The present invention is a method of shifting gears within a hydrostatic transmission and the device for accomplishing the same. The hydrostatic transmission uses a first variable displacement unit that is connected to a planetary gear system and a second variable displacement unit. Additionally, the transmission has a rotatable shaft that is operably connected to the second variable displacement unit and has a fixed clutch disc thereon that can engage either a first clutch element or a second clutch element in order to engage the planetary gear system. When the first clutch element is engaged with the fixed clutch disc a first clutch is created, thus driving the transmission in a first mode. When the second clutching element and the fixed clutch disc are engaged, a second clutch is created and the transmission runs in a second mode. During operation, the first clutch element is attached to a first clutch gear that has a first rotational speed and the second clutching element is attached to a second clutch gear having a second rotational speed. Electrically monitoring these first and second rotational speeds along with the first and second variable displacement units is an electronic control unit.

This disclosure identifies a method for achieving high quality shifts with one hydraulic unit near zero displacement when using dog clutches. This method includes selecting the proper displacement and vocation (whether the hydrostatic unit works as a pump or motor) of the low displacement hydraulic unit during the shift, selecting the appropriate speed differential between the clutch elements, selecting the proper vehicle speed at which to make the shift, and sequencing the displacement changes of the hydraulic units in order to achieve the desired shift conditions.

DETAILED DESCRIPTION OF THE INVENTION

Figure 1:
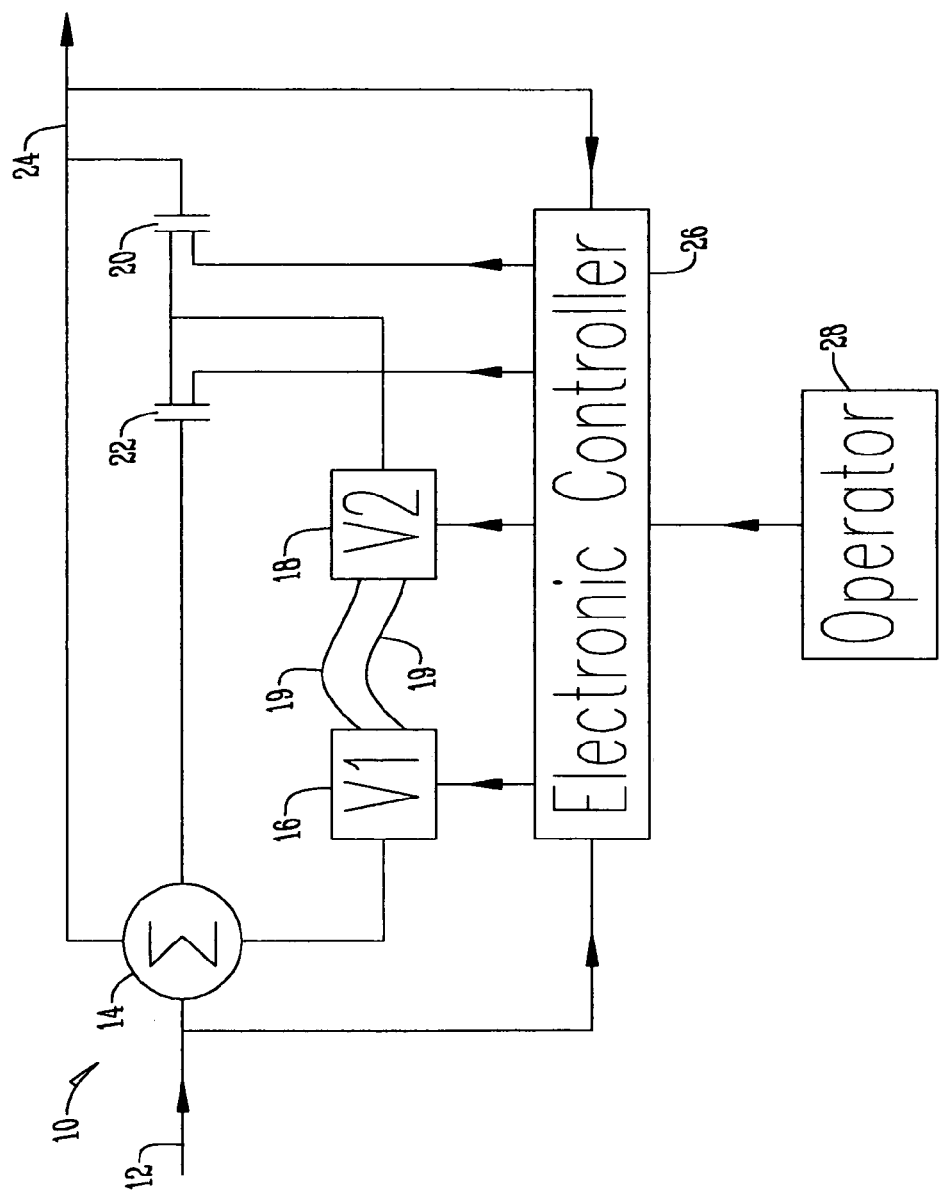
FIG. 1 is a hydromechanical transmission block diagram.

FIG. 1 shows a block diagram of the two-mode hydro-mechanical transmission 10 of the present invention. The transmission 10 has an input shaft 12 that is rotatably connected to a planetary gear system 14. Rotatably connected to the planetary gear system 14 is a first variable displacement hydrostatic unit 16 that is fluidly connected to a second variable displacement hydrostatic unit 18 via hydraulic fluid lines 19. The system 10 is designed such that the planetary gear system 14 can be connected to the second variable displacement hydrostatic unit 18 by a first clutch 20 or a second clutch 22, depending on the desired mode of the transmission. Depending on the rotation of the input shaft 12, the outputs of the first and second variable displacement hydrostatic units 16, 18, and the clutching of the planetary gear system 14 by clutches 20, 22, an output shaft 24 will be driven at an output rotational speed. An electronic controller or control unit 26 will monitor the rotation of the input shaft 12 and output shaft 24 and based on the desires of an operator 28 will actuate the first and second variable displacement hydrostatic units 16 and 18 and first and second clutches 20 and 22 as is required to produce the desired output rotational speed of the output shaft 24 to drive a device.

Figure 2:
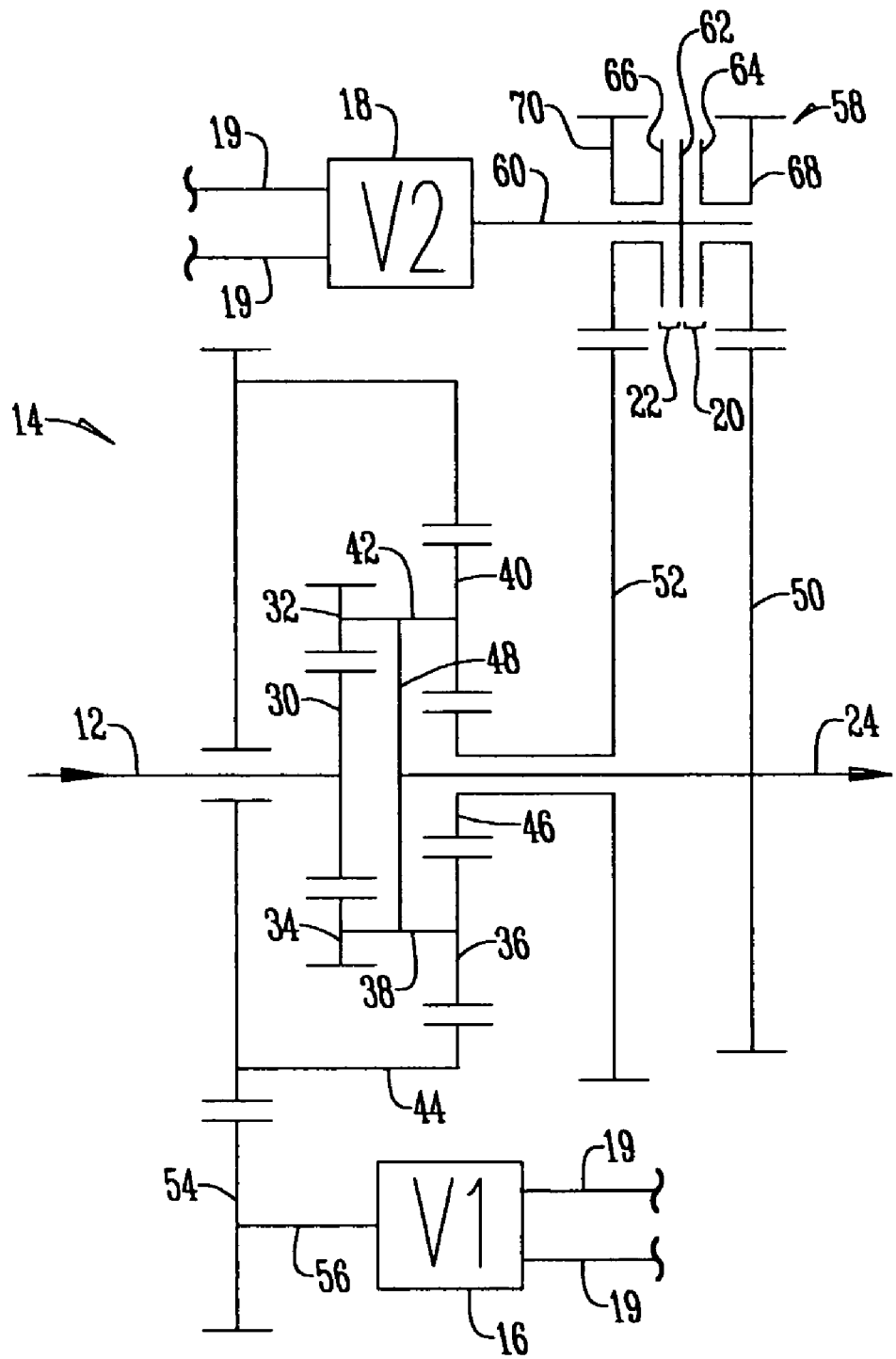
FIG. 2 is a gear schematic of the hydromechanical transmission of FIG. 1.

FIG. 2 shows the planetary gear system along with its connection to the first and second variable displacement units 16 and 18 respectively. The planetary gear system 14 is driven by the input shaft 12 that drives a sun gear 30. The sun gear 30 meshes with a first planetary gear 32 and second planetary gear 34 and drives a third planetary gear 36 with a shaft 38 and a fourth planetary gear 40 with a shaft 42. Third and fourth planetary gears 36 and 40 mesh with a ring gear 44 and a sun gear 46. Collectively, first, second, third and fourth planetary gears 32, 34, 36, and 40 are supported by a carrier 48 that is rotatably connected to the output shaft 24 having a first gear 50 fixedly attached thereto. Sun gear 46 rotatably surrounds the output shaft 24 and is connected to a second gear 52 that rotatably surrounds the output shaft 24 and is in spaced apart relation from the first gear 50. Thus, the entire planetary gear system 14 is defined.

The planetary gear system 14 is rotatably connected to a third gear 54 that is fixedly attached to a first rotatable shaft 56 of the first variable displacement hydrostatic unit 16. Thus the unit 16 is connected to the planetary gear system 14.

The second variable displacement hydrostatic unit 18 is connected to the planetary gear system 14 via a clutching system 58 that clutches a second rotatable shaft 60 of the second variable displacement hydrostatic unit 18. Fixedly attached to the rotatable shaft 60 is a fixed clutch disc 62 that is rotated via the rotatable shaft 60 and can be clutched to a first clutch element 64 to create the first clutch 20, thus placing the transmission 10 in a first mode, or can be clutched to a second clutch element 66 to create a second clutch 22, thus placing the transmission 10 in a second mode. One skilled in the art will appreciate that dog clutches could be used as clutches 20 and 22 in this process. Attached to the first clutch element 64 is a first clutch gear 68 that meshes with the first gear 50 of the planetary gear system 14. Attached to the second clutch element 66 is a second clutch gear 70 that meshes with the second gear 52 of planetary gear system 14.

One skilled in the art will also appreciate that when the fixed clutch disc 62 and the first clutch element 64 engage to create clutch 20 that the second variable displacement unit 18 will drive the first gear 50 via the first clutch gear 68 thus controlling the rotation of the output shaft 24 in a first mode. Meanwhile, if the fixed clutch disc 62 is engaged with the second clutch element 66 creating second clutch 22, the second variable displacement unit 18 will control the rotation of the second gear 52 of the planetary gear system 14 via second clutch gear 70 and will consequently control the rotational speed of the output shaft 24 in a second mode.

Additionally, one skilled in the art will realize that this planetary gear system 14 is one of many that can be used to accomplish the shifting method of the present invention. Additionally, one skilled in the art will appreciate that the electronic controller or control unit 26 is electrically connected to the first and second clutches 20 and 22, and to the first and second hydrostatic units 16 and 18 to control the shifting of the transmission.

In operation, starting from zero output speed, clutch 20 is engaged and clutch 22 is disengaged. Hydrostatic unit 16 is at zero displacement and hydrostatic unit 18 is at maximum displacement. In a driving mode, the engine delivers power to shaft 12 and sun gear 30. Input power is split with a portion going to ring 44/unit 16, and a portion going to carrier 48/output shaft 24. As hydrostatic unit 16 is increased to larger negative displacements (A sign convention for hydraulic units is established that assigns positive displacements to motors and negative displacements to pumps), it hydraulically drives hydrostatic unit 18 which in turn adds power to output shaft 24 through clutch 20 and gear set 50 and 68. As output speed increases, the first hydrostatic unit 16 continues to increase negatively and the second hydrostatic unit 18 decreases in displacement. One skilled in the art will appreciate that the controller 26 is programmed to accomplish the desired logic for changing the displacement of first and second hydrostatic units 16 and 18, and for selectively engaging first and second clutches 20 and 22. Thus unit displacement changes may be sequenced or changed concurrently by the controller 26.

As the second hydrostatic unit 18 reduces displacement, its speed increases in proportion to the speed of output shaft 24 and carrier 48. This raises the speed of gear 68 and at the same time the speed of sun gear 46 is decreasing, thus slowing gear 52 and 70. One skilled in the art will understand that the gear ratios are selected so that gear 68 and gear 70 are approximately synchronous when the second hydrostatic unit 18 is at or near zero displacement. This allows clutches 20 and 22 to be exchanged by controller 26 with no change in transmission ratio. After the exchange of clutches 20 and 22, the controller 26 continues to increase the displacement of the second hydrostatic unit 18 in a negative direction while first hydrostatic unit 16 remains at or near maximum displacement. This continues to change the transmission ratio and increase output speed. Before and after the shift, the high pressure in the closed circuit lines 19 does not switch from one side to the other, although the magnitude of the high pressure may change. The power flow in the hydrostatic transmission does change direction as the displacement of the second hydrostatic unit 18 changes sign (from a motor to a pump) before and after shift, and the speed of the first hydrostatic unit 16 changes sign before and after the shift. Thus, after the upshift, the vocation of first hydrostatic unit 16 is a motor and the second hydrostatic unit 18 is a pump when driving.

On downshifts, the process is reversed and the shift to a lower speed mode is achieved by exchanging second clutch 22 for first clutch 20 as the second hydrostatic unit 18 passes near zero displacement. Similarly, braking upshifts and down shifts are accomplished with first and second clutches 20 and 22 near synchronous speed and the second hydrostatic unit 18 near zero displacement. Braking occurs when power flow is reversed, such as when traveling downhill and using engine friction to retard vehicle motion. Note that high pressure changes sides in the closed circuit 19 when braking, and the vocation of the first and second hydrostatic units 16 and 18 are switched. While these shifts are similar in basic approach, controller 26 preferably has logic programmed that regulates each shift type in a manner to achieve consistent high quality shifts as described.

According to this invention, setting the displacement of the hydrostatic units 16 and 18 at the point of shifting to certain displacements will improve the shifting quality within a hydromechanical transmission. To determine the desired displacements of the hydrostatic units 16 and 18 one skilled in the art must look at the volumetric and torque losses associated with the hydrostatic units 16 and 18. When a hydrostatic unit 16 or 18 is continuously changed from a positive displacement to a negative displacement, with the high pressure remaining on the same side of the closed circuit, the function of the unit changes from a motor to a pump. There are well-known flow and torque losses associated with pumps and motors and they act in predictable ways away from zero displacement. When a hydrostatic unit 16 or 18 is operated near zero displacement, the change from a motor to a pump is at a different displacement for torque than it is for flow related behavior, and neither occurs at zero displacement. This affects the displacement at which a hydrostatic unit 16 or 18 should be disengaged during a hydromechanical transmission mode shift.

Figure 3:
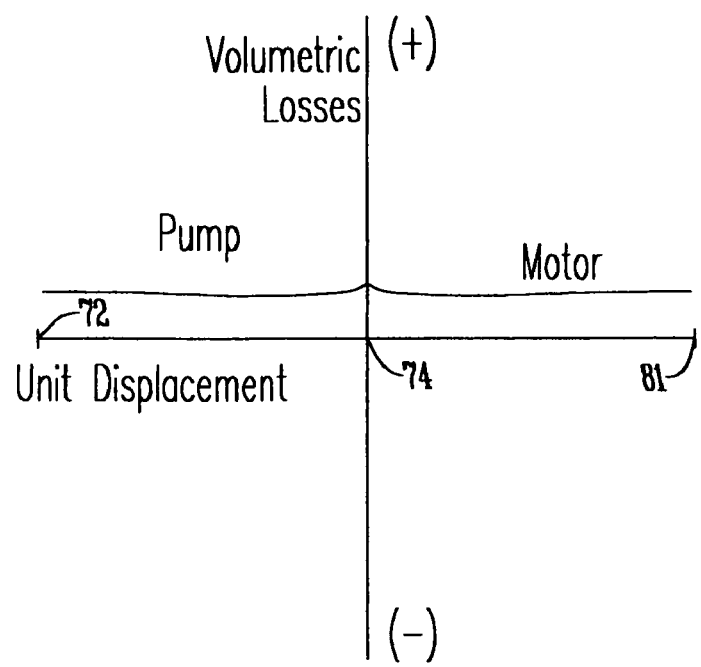
FIG. 3 is a graph showing volumetric losses vs. displacement for pumps and motors.

FIGS. 3-7 are graphs showing different qualities of a hydrostatic unit at different displacements. The numerals assigned to show unit displacement are arbitrary do not represent measurements (e.g. millimeters, inches, etc.). The numerals assigned range from a minimum displacement of 72 that is seen as the maximum negative displacement to a maximum positive displacement of 81. Reference numeral 74 will represent the hydrostatic unit at zero displacement. As seen in FIG. 3, volumetric losses are graphed as a hydrostatic unit changes from positive to negative displacement at a constant pressure and speed. Across this range, the hydrostatic unit changes vocation from a motor to a pump as displacement is decreased. Motors are generally in the positive displacement range and pumps are generally in the negative displacement range. Near zero displacement, there is overlap of function. In FIG. 3, the volumetric losses are nearly constant throughout the displacement range. Some types of units may experience a slight increase in volumetric loss near zero displacement.

Figure 4:
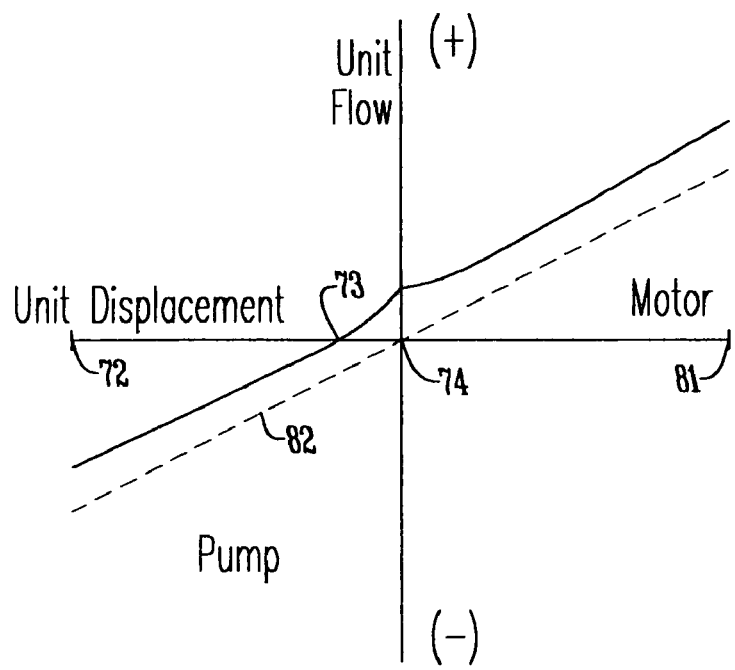
FIG. 4 is a graph showing unit flow vs. displacement for pumps and motors.

The losses of FIG. 3 are transposed to the unit flow graph of FIG. 4, also across the positive to negative displacement range. Line 82 is theoretical flow with no losses. The unit does not start producing flow as a pump until a finite negative displacement 73 is achieved. For all negative displacements larger than 73, the unit produces flow at a lesser amount than theoretically predicted. For displacements between 73 and 74 (and larger), the unit acts as a motor regarding flow behavior; it accepts flow at a greater amount than theoretically predicted.

Figure 5:
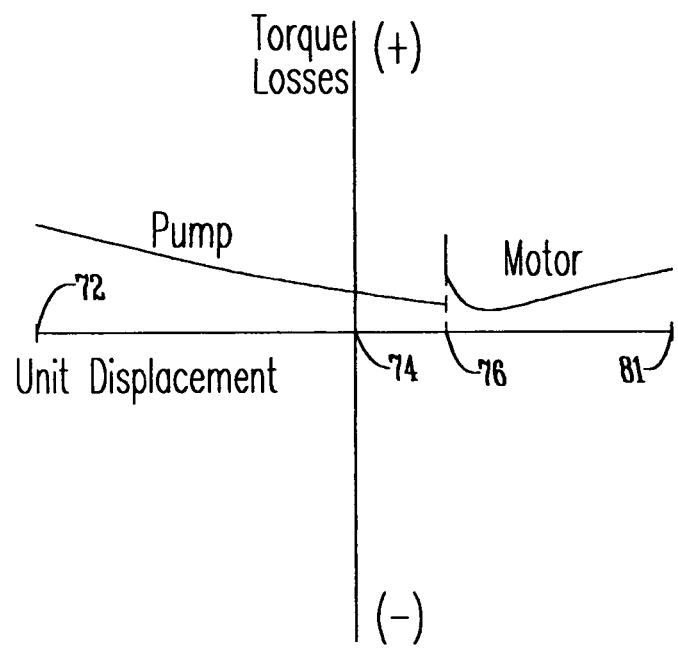
FIG. 5 is a graph showing unit torque losses vs. displacement for pumps and motors.

FIG. 5 shows torque losses over the same displacement range as FIG. 3, under conditions of constant speed and pressure. When acting as a motor and producing torque, the losses increase substantially as displacement nears a low but positive displacement 76. Thus the internal friction within the hydrostatic unit nears the magnitude of the torque produced. In order to maintain speed with displacement decreasing below 76, torque must be supplied and the unit becomes a pump regarding torque behavior.

Figure 6:
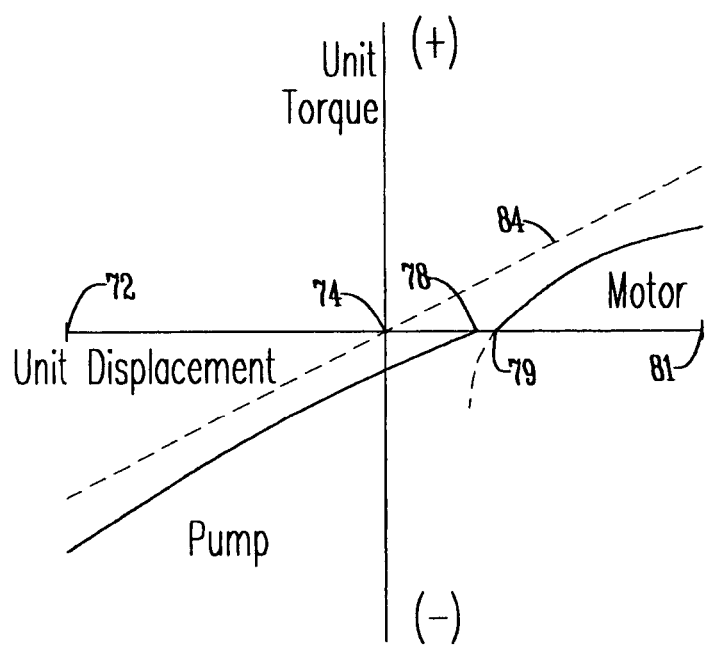
FIG. 6 is a graph showing torque vs. displacement for pumps and motors.

The losses of FIG. 5 are transposed to the unit torque graph of FIG. 6, also across the positive to negative displacement range. Line 84 is theoretical torque with no losses. The unit produces torque as a motor at displacements greater than 79. For all displacements smaller than 78, the hydrostatic unit requires torque to turn and acts like a pump regarding torque behavior. Between displacements 79 and 78 there is a torque dead zone where no net torque is required to maintain unit speed.

Figure 7:
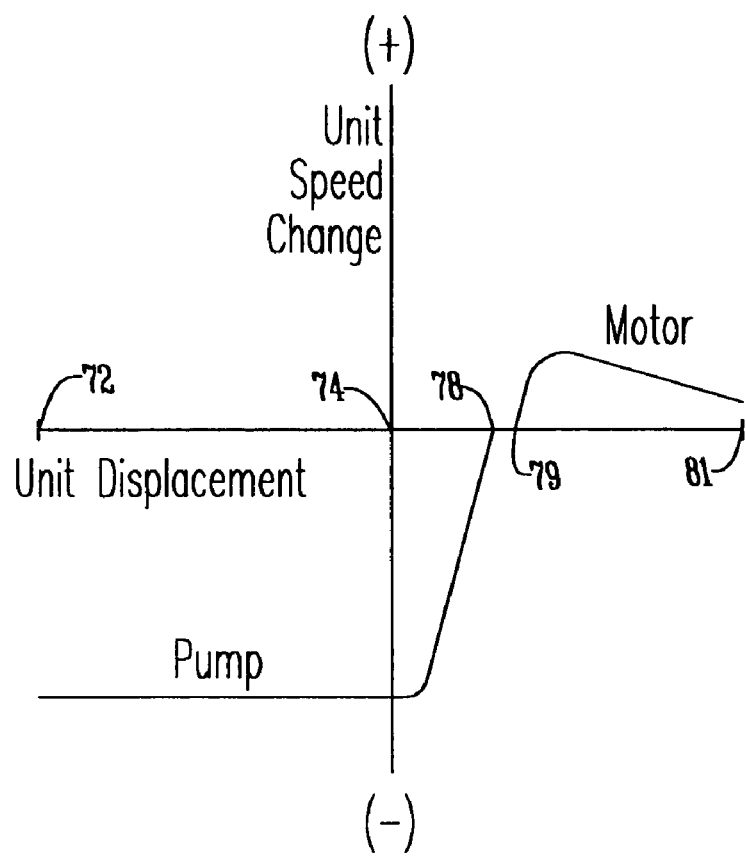
FIG. 7 is a graph showing speed change vs. displacement for pumps and motors.

FIG. 7 shows the speed change that occurs if the hydrostatic unit shaft 60 is decoupled when at the speed and pressure conditions of FIGS. 3-6. This is similar to declutching hydrostatic unit 18 during a shift. FIG. 7 assumes a fixed source of flow. The speed change shown in FIG. 7 results from a balance of the torque available from a hydrostatic unit at its equilibrium pressure and the torque losses consumed at its equilibrium speed. Above displacement 79, the unit acts as a motor and increases speed depending on the exact displacement, the pressure prior to the shift, and unit torque efficiency. Below displacement 78, the unit acts as a pump and speed decreases depending on displacement. At negative displacements, the unit speed will decrease to zero as it is always a pump that requires torque to turn. At low positive displacements, the unit may reach equilibrium at a non-zero speed and the unit will transition to motor status as the speed decreases faster than the pressure. In the torque dead zone the speed does not change as there is no net torque produced or consumed by the unit.

The position and width of the torque dead zone is determined by the torque losses and the torque pulsations of the unit. Higher torque losses would tend to increase the torque dead zone, and higher torque pulsations would tend to decrease the torque dead zone. Under some conditions, displacement 79 and 78 may coincide, or may move higher or lower, resulting in a lack of a predictable or usable torque dead zone. Under these conditions, there is still a transition from a motor torque characteristic to a pump torque characteristic with the resulting speed changes. FIG. 7 also establishes target shift displacements for hydrostatic units with an unusable torque dead zone that when accounting for tolerances would provide displacements larger than 79 for a motor and smaller than 78 for a hydrostatic unit having pump torque behavior.

To achieve a shift within or near the torque dead zone of a hydrostatic unit, the hydrostatic unit must operate at a near zero displacement. In a two-variable displacement unit hydromechanical transmission, when a hydrostatic unit is operated near zero displacement, it is difficult for the hydrostatic unit to control its own speed, as there is no pressure feedback to the flow input. Also, a small variation in leakage in the closed circuit will result in a large variation in speed or displacement of the unit. Therefore, it is better to change the large displacement (the unit having a large displacement)

unit to control the speed of the small unit (the unit having a near zero displacement), and pre-set the small unit displacement at the desired amount. If the small unit is pre-set at a displacement near zero, changes in the speed of the small unit during shifts will have little effect on the operation of the hydromechanical transmission.

Figure 8A:
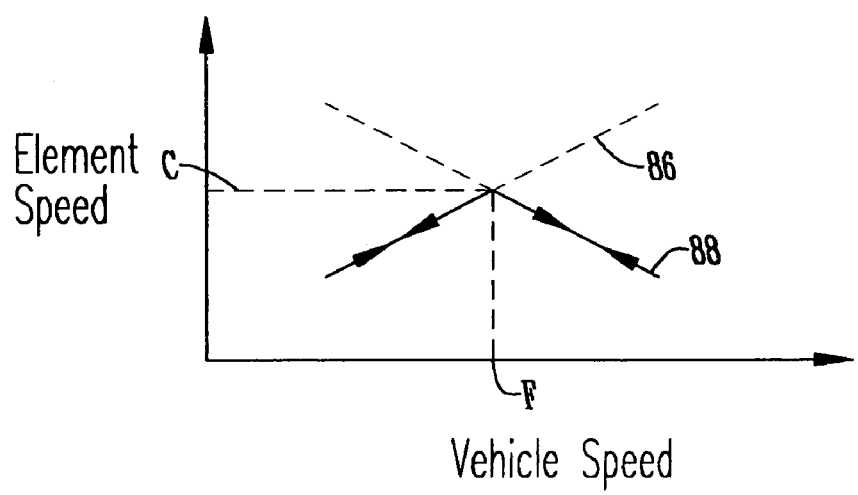
FIG. 8A is a graph of element speed of first and second clutch gear elements vs. the vehicle speed during a synchronous speed shift.

The relationship between the displacement of the second variable displacement hydrostatic unit 18 and how it facilitates the shifting process is best described when referring to FIGS. 8A-8E. FIGS. 8A-8E graphically show the rotational speed of the fixed clutch disc 62 using the described shifting method when compared to the vehicle speed. FIG. 8A shows line 86 represents the speed of dog clutch element 64 that is connected to gear 68. Clutch element 64 increases speed with increasing output speed. Line 88 represents the speed of dog clutch element 66 that is connected to gear 70. Clutch element 64 decreases speed with increasing output speed. At point C, the speed of the second hydrostatic unit 18 is near to its maximum limit. At point F, both clutch elements 64 and 66 have the same speed. With the second hydrostatic unit 18 displacement in the torque dead zone, disc 62 can be moved to change engagement from first clutch 20 to second clutch 22 or vice versa. The ability to do this consistently would depend on the width and stability of the torque dead zone, the tolerance of the setting of the displacement of the second hydrostatic unit 18, and the engagement characteristics of the clutch elements. One skilled in the art will understand that the first hydrostatic unit 16 can be sequenced with the displacement changes of the second hydrostatic unit 18 to increase the accuracy of the displacement of the second hydrostatic unit 18 at the time of the shift.

FIGS. 8B-8E illustrate shift sequences that account for tolerances in the unit torque dead zone. These sequences also accommodate dog clutches with synchronizers that require a torque reduction below a threshold to fully engage.

Figure 8B:
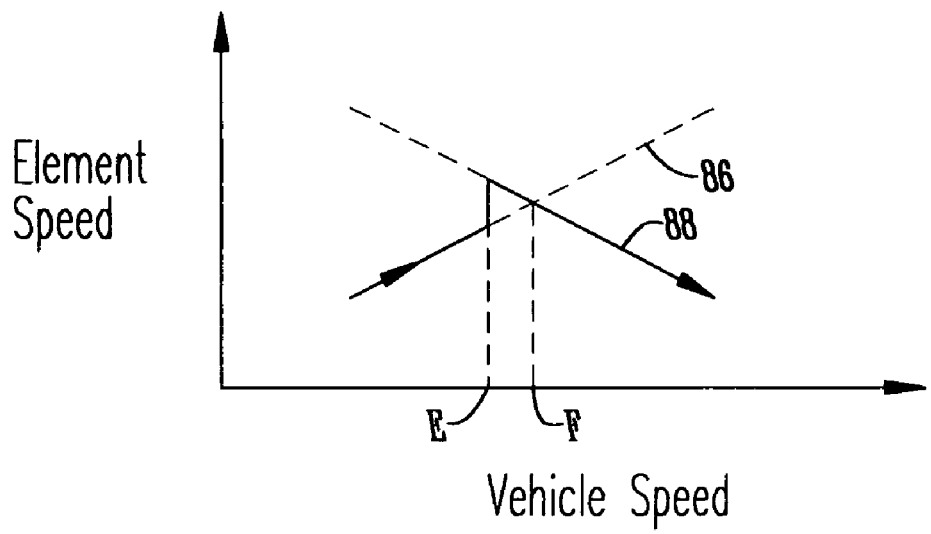
FIG. 8B is a graph of element speed of first and second clutch gear elements vs. the vehicle speed for up shifts when a vehicle is driving.

FIG. 8B shows a driving up shift as is previously described. As seen by FIG. 8B, a shift is initiated at a predetermined vehicle speed E by disengaging the first clutch 20. Speed E is slower than speed F, the synchronous clutch speed. At the point of disengagement, the fixed clutch disc 62 is rotating at a speed lower than the desired synchronous speed needed to engage the second clutch element 66. Because of increased vehicle speeds the second hydrostatic unit 18 is generally decreasing displacement and remains a motor above displacement 79 (FIGS. 3-7). Under these conditions, the second variable displacement hydrostatic unit 18 tends to speed up when clutch 20 is disengaged. As the speed of the second variable displacement hydrostatic unit 18 increases, it drives up the speed of the fixed clutch disc 62 to become synchronous with second clutch element 66 thus taking advantage of the natural speed increase of the second variable displacement unit 18. After engagement, the second variable displacement unit 18 becomes a pump and consequently clutch disc 62 and clutch element 66 will experience a torque reduction below a threshold thus allowing a dog clutch having synchronizers to be engaged as is well known in the art.

Figure 8C:
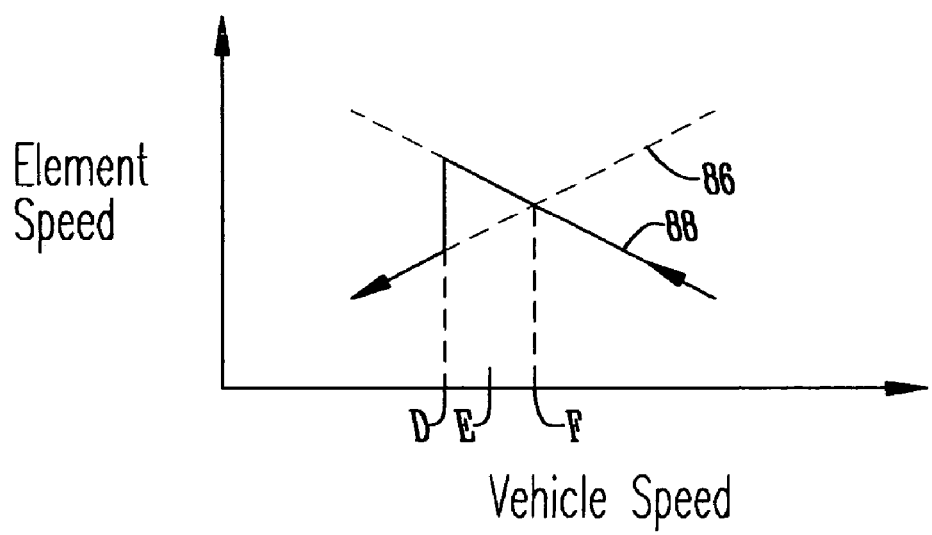
FIG. 8C is a graph of element speed of first and second clutch gear elements vs. the vehicle speed for down shifts when a vehicle is driving.

FIG. 8C shows a graphic representation of down shifting while driving. The shifting is initiated at the predetermined vehicle speed D by disengaging clutch 22. Speed D is slower than speed E so that a hysteresis loop exists for accomplishing continuing reshifts. As the vehicle speed decreases, the second hydrostatic unit 18 has a smaller negative displacement and retains a pump torque characteristic below displacement 78 (FIGS. 3-7), thus the second hydrostatic unit 18 naturally tends to slow down when the second clutch 22 is disengaged. Because of the decrease in speed of the second variable displacement hydrostatic unit 18 the speed of the fixed clutch disc 62 slows and becomes synchronous with the first clutch element 64, at which point in time the first clutch 20 is engaged. After engagement, the variable displacement hydrostatic unit 18 becomes a motor and the fixed clutch disc 62 and first clutch element 64 experience a torque reduction below a threshold that allows dog clutches with synchronizers to fully engage.

Graph 8D shows the speed of the fixed clutch disc 62 when an up shift occurs during braking such as when a vehicle is driving down a hill. The shift is initiated at a vehicle speed H by disengaging the first clutch 20. Speed H is faster than speed F, the synchronous clutch speed. Initially, incoming clutch 22 is not synchronous as the clutch element 66 is at a lower speed than disc 62. With increasing vehicle speed, hydrostatic unit 18 is increasing displacement and remains a pump below displacement 78 (FIGS. 3-7). Under these conditions, hydrostatic unit 18 would tend to slow down when first clutch 20 is disengaged. As hydrostatic unit 18 speed decreases, it slows down disc 62 to become synchronous with clutch element 66, and second clutch 22 is engaged. After engagement, when the second clutch 22 has synchronizers, hydrostatic unit 18 becomes a motor and the clutch disc 62 and clutch element 66 experience a torque reduction below a threshold in order to fully engage second clutch 22.

Figure 8D:
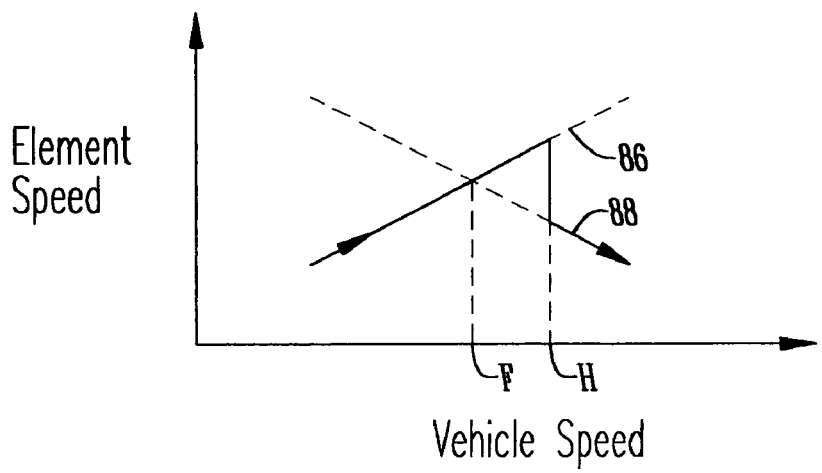
FIG. 8D is a graph of element speed of first and second clutch gear elements vs. the vehicle speed for up shifts when a vehicle is braking.
Figure 8E:
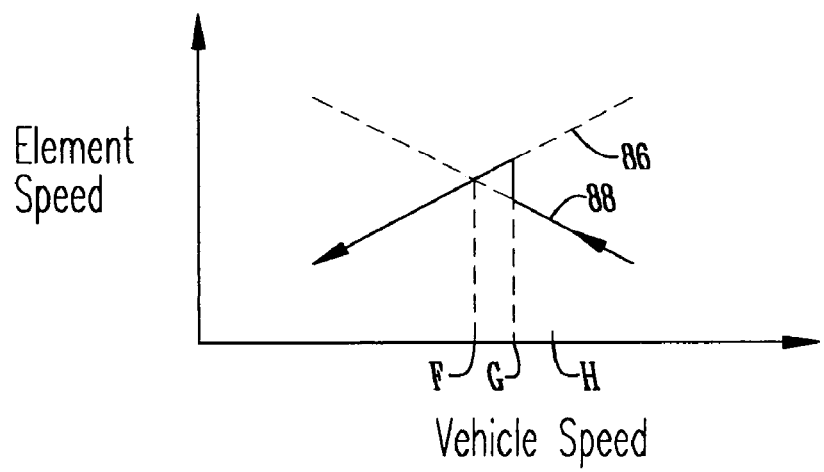
FIG. 8E is a graph of element speed of first and second clutch gear elements vs. the vehicle speed for down shifts when a vehicle is braking.

FIG. 8E shows the final shift, a downshift that occurs while braking. A shift is initiated at vehicle speed G by disengaging the second clutch 22. Speed G is slower than speed H so that a hysteresis loop exists for accomplishing continuing reshifts. As vehicle speed decreases, second hydrostatic unit 18 has generally decreasing displacement, and remains a motor above displacement 79 (FIGS. 3-7). Under these conditions, the second hydrostatic unit 18 would tend to speed up when the second clutch 22 is disengaged. Initially, incoming clutch element 64 is at a higher speed than disc 62. As the speed of the second hydrostatic unit 18 increases, the unit speeds up disc 62 to become synchronous with element 64, and first clutch 20 is engaged. After engagement, the second hydrostatic unit 18 becomes a pump and the clutch disc 62 and element 64 experience a torque reduction below a threshold in order to fully engage the first clutch 20.

Figure 9:
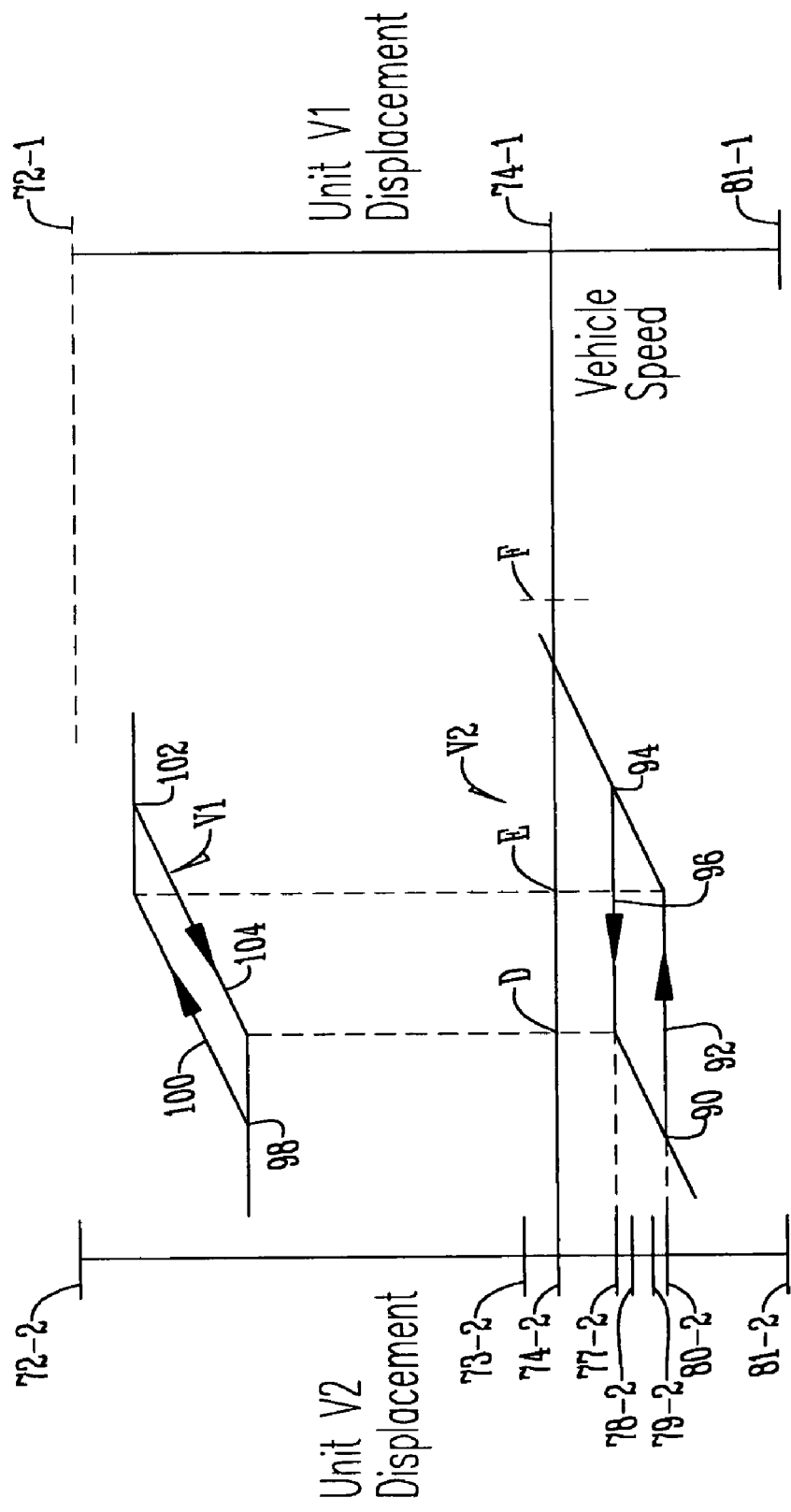
FIG. 9 shows the displacement of the first and second variable displacement units vs. the vehicle speed when the vehicle is driving.
Figure 10:
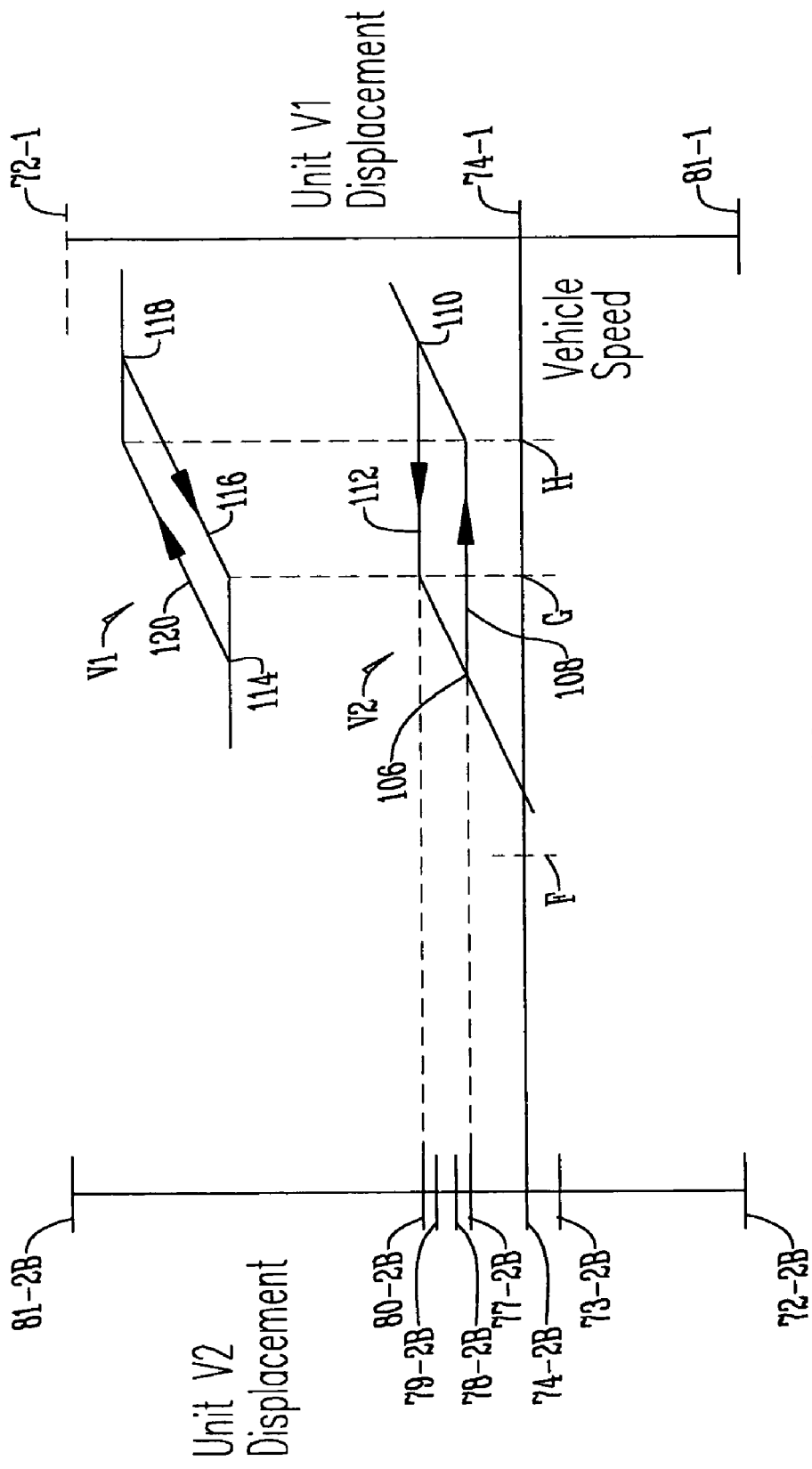
FIG. 10 shows the displacement of the first and second variable displacement units vs. the vehicle speed when the vehicle is braking.

These shift sequences are also shown in FIGS. 9 and 10. This is the domain for analyzing suitability of displacement changes, particularly through a shift. FIGS. 9 and 10 show the sequencing of hydrostatic units 16 and 18 displacements through a shift, as well as the relationship of vehicle shift speeds from FIGS. 8B-8E with the target shift displacements from FIG. 7. The sign convention remains generally positive displacements for motors and generally negative displacements for pumps. A high displacement unit would have a displacement near to 72 or 81 (FIGS. 3-7). Meanwhile a low displacement unit would have a value near 74 or zero displacement.

FIGS. 9 and 10 are drawn with the vertical unit displacement axis representing the physical position of the unit stroking mechanism. The left axis is labeled for second hydrostatic unit 18 displacement and the right axis for hydrostatic unit 16 displacement. The axis values are the same as the displacements of FIGS. 3-6 with the addition of a −1 or −2 suffix to indicate the first and second hydrostatic units 16 and 18 values.

In driving mode when approaching an upshift, first hydrostatic unit 16 is a pump and is increasing displacement. Second hydrostatic unit 18 is a motor and is generally decreasing displacement. As planned from FIG. 8B, a shift would be initiated at vehicle speed E. Second hydrostatic unit 18 should be at a displacement greater than 79 (FIGS. 3-7) so that its speed will always increase to make the clutch disc 62 and clutch element 66 synchronous, even in the presence of unfavorable tolerances.

FIG. 9 shows the displacement of the first and second variable displacement hydrostatic units during shifting as the vehicle speed increases as consistent with FIGS. 8D-8E. In FIG. 9 numerals 90, 92, 94 and 96 represent measurements taken regarding the second variable displacement hydrostatic unit 18 and numerals 98, 100, 102 and 104 represent measurements taken regarding the first variable displacement hydrostatic unit 18. Beginning at point 90 wherein the second variable hydrostatic transmission 18 reaches a displacement of 80-2, which is larger than displacement 79-2 the vehicle speed is lower than E thus allowing the unit 18 to always reach and hold displacement 80-2 independently of system tolerances. At point 90 the unit 18 displacement is held at 80-2 along line 92. Simultaneously, the first hydrostatic unit 16 changes displacement at point 98 along line 100 to increase the vehicle speed to E. At that time, the up shift from the first clutch 20 to the second clutch 22 is made, as previously described and shown in FIG. 8B, and the second hydrostatic unit 18 displacement is changed to further increase vehicle speed. At vehicle speeds above point 102 the first variable displacement hydrostatic unit 16 may be held constant or increased to its maximum negative displacement 72-1 if desired. Control unit 26 provides the logic to change either of the displacements of hydraulic units 16 or 18 and to actuate and de-actuate the first and second clutch 20 and 22. Thus, as the vehicle speed increases, the second variable displacement hydrostatic unit 18 crosses displacement 74 and consequently has a negative displacement prior to reaching a vehicle speed of F. This allows shift cycling between driving and braking reshifts.

For driving down shifts, the vehicle speed D is achieved with the second hydrostatic unit 18 at a displacement smaller than 78. This is planned from FIG. 8C, which requires hydrostatic unit 18 to have a pump torque characteristic. At point 94 the second hydrostatic unit 18 displacement is held at 77-2 along the line 96 and the first variable displacement hydrostatic unit 16 is decreased from point 102 along line 104. At vehicle speed D, the shift is initiated by deactuating the second clutch 22 so that the second hydrostatic unit 18 slows down, and clutch element 64 and clutch disc 68 become synchronous such that first clutch 20 is engaged, and at that time the second hydrostatic unit 18 increases displacement negatively. At vehicle speeds below point 98, the first hydrostatic unit 16 may also be changed to a smaller negative displacement.

FIG. 10 shows the unit displacement of the first and second hydrostatic units 16 and 18 while the vehicle is braking consistent with FIGS. 8D and 8E. Numerals 106, 108, 110, 112 represent measurements taken regarding the second variable displacement hydrostatic unit 18 and numerals 114, 116, 118, 120 represent measurements taken regarding the first variable displacement hydrostatic unit 18. The axes are labeled similarly to FIG. 9 with the left axis inverted as second hydrostatic unit 18 has changed the sign of its displacement. The side of the closed circuit with high pressure has also changed. The displacement values have a B suffix for the inverted second hydrostatic unit 18 axis. The right axis has not changed because first hydrostatic unit 16 did not change the sign of its displacement. (though it did change the direction of rotation and the high-pressure side). In braking mode when approaching an upshift, second hydrostatic unit 18 is a low displacement unit with a positive value, and first hydrostatic unit 16 is a pump. The second hydrostatic unit 18 is generally increasing displacement and the first hydrostatic unit 16 is moving to a larger negative displacement. As planned from FIG. 8D, a shift should be initiated at vehicle speed H. Second hydrostatic unit 18 should be at a displacement smaller than 78, so that its speed will always decrease to make the clutch element 66 and clutch disc 62 synchronous, even in the presence of unfavorable tolerances. Control unit 26 provides the electrical signals to change the displacements of first and second hydrostatic units 16 and 18 and to actuate/deactuate first and second clutches 20 and 22.

When making the braking up shifts the second variable displacement hydrostatic unit 18 reaches displacement 77-2B at point 106. This is at a lower vehicle speed than H, in order to allow second hydrostatic unit 18 to always reach displacement 77-2B independently of system tolerances. At point 106, the unit 18 displacement is held at 77-2B along line 108, and the first hydrostatic unit 16 simultaneously changes displacement at point 114 to increase vehicle speed to H along line 120. At that time, the shift is made as described in FIG. 8D by deactuating the first clutch 20 and actuating the second clutch 22. The displacement of the second hydrostatic unit 18 may be changed as at point 110 to further increase vehicle speed. If desired, at vehicle speeds above point 118 the first hydrostatic unit 16 may be held constant or increased to its maximum displacement 72-1.

For braking downshifts, vehicle speed G must be achieved with the second hydrostatic unit 18 at a displacement larger than 79. At point 110, the displacement of the unit 18 is held at 80-2B along line 112, and the first variable displacement unit 16 is decreased along line 116. At vehicle speed G, the shift is initiated and the second variable displacement unit 18 speeds up causing first clutch element 64 and fixed clutch disc 62 to become synchronous. At vehicle speeds below point 114 the first variable displacement unit 16 may also be decreased in displacement. As vehicle speed decreases, the first unit 16 crosses displacement 74 and then has a negative displacement prior to reaching vehicle speed F, the synchronous speed point. This allows shift cycling between driving and braking reshifts. Also note that the first hydrostatic unit 16 does not reverse its direction until the second hydrostatic unit 18 passes displacement 73-2B.

Other options also exist for selecting the vehicle speed at which to make shifts if the clutch requirements of the vehicle control design are different than described. For instance, if the clutches are without synchronizers and therefore do not require torque reduction below a threshold, driving up shifts could be initiated at vehicle speed G (FIGS. 8A-10) and wherein the second variable displacement hydrostatic unit 18 has a displacement of 77-2. Similarly, braking downshifts would be at a vehicle speed E (FIGS. 8A-10) and with a second variable displacement hydrostatic unit 18 at a displacement 77-2. This maintains up shifts at a higher vehicle speed and downshifts and braking shifts at a higher speed than at driving shifts.

If engine hysteresis were used to lower the speed of downshifts below upshifts, and to raise braking shifts above driving shifts, then driving upshifts could be done at vehicle speed D and driving downshifts at vehicle speed E. Similarly, braking upshifts would be at G and Downshifts at H. This allows the possibility of only changing the displacement of the second hydrostatic unit 18 during the shift. Other shift possibilities are possible which preserve the characteristic of the incoming clutch elements moving toward synchronous speed when the outgoing clutch is disengaged.

The method of the present invention involves shifting the hydromechanical transmission 10 with the control unit 26. Before the operation of the hydromechanical transmission one must determine the displacement at which each hydrostatic unit 16 and 18 is in a torque dead zone as described above. Once these displacements are determined the control unit 26 is programmed to control the displacement of each of the hydrostatic units such that at a predetermined vehicle speed one of the units 16 or 18 will have a displacement that will be within or near to the torque dead zone when shifting occurs between a first and second clutch. Thus the unit 16 or 18 that has a displacement within or near to the torque dead zone will be a low displacement unit. Because the shifting method of the present invention will create a torque reduction below a threshold, dog clutches can be used to perform the shifting function. Furthermore, the control unit 26 can be programmed such that when the shifting occurs when the clutches are at synchronous speeds.

Control unit 26 measures input shat 12 speed, output shaft 24 speed and knows which clutch is engaged. Consequently, control unit 26 can calculate the speed of first unit 16 and second unit 18. The displacement of second unit 18 can be estimated from this information. The accuracy of the estimate may be improved by compensating for system pressure and by having an accurate measure of first unit 16 displacement.

Furthermore, the method of the present invention can involve the shifting of the transmission at a displacement of a hydrostatic unit that falls just outside the torque dead zone so that the speed of the low displacement hydrostatic unit changes in a direction to move the clutches into synchronous speed. This method can occur when the shift is an upshift or a downshift. Additionally, the control unit 26 can be programmed to sequence the displacement of the hydrostatic units to ensure proper smoothness in the shift. Also, the control unit can be programmed to make the shifts at predetermined speeds, though one skilled in the art understands that the predetermined speed for the upshift may be different than the predetermined speed of the down shift to ensure the desired shifting environment. One skilled in the art will also understand that even when the shift falls just outside of the torque dead zone, a torque reduction below a threshold still occurs during the shift allowing the use of dog clutches. Finally, one skilled in the art will appreciate that the control unit 26 can be programmed to hold the high displacement hydrostatic unit at the same displacement during the shifting process. Consequently, all of the disclosed objects have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A method of shifting a hydromechanical transmission having at least two variable displacement hydrostatic units comprising steps of:
   determining the displacement of a first hydrostatic unit when the unit is in a torque dead zone wherein no net torque is required to maintain unit speed; and
   shifting the transmission at the determined displacement.

2. The method of claim 1 wherein the shifting occurs between a first and second clutch elements.

3. The method of claim 2 wherein at least one clutch is a dog clutch.

4. The method of claim 2 wherein the shifting occurs when the first and second clutch elements are at a substantially synchronous speed.

5. A method of shifting a hydromechanical transmission in a vehicle first and second hydrostatic units comprising steps of:
   determining the displacement of the first hydrostatic unit when the unit is near a torque dead zone; and
   shifting the transmission at a displacement outside the torque dead zone using first and second clutch elements such that the first unit speed changes in a direction to move the clutch elements into synchronous speed.

6. The method of claim 5 wherein the shifting of the transmission is an upshift.

7. The method of claim 5 wherein the shifting of the transmission is a downshift.

8. The method of claim 5 wherein the second hydrostatic unit is changed.

9. The method of claim 8 wherein a control unit sequences the displacements of the hydrostatic units.

10. The method of claim 5 wherein the clutch elements undergo torque reduction during the shifting process.

11. The method of claim 5 further comprising of steps:
    determining the speed of the vehicle; and
    programming a control unit to make upshifts at a predetermined speed.

12. The method of claim 11 wherein down shifts are made at a predetermined speed.

13. The method of claim 11 wherein the high displacement unit does not change displacement during the shift.

14. The method of claim 5 wherein a control unit measures an input shaft speed and an output shaft speed.

15. A method of shifting a hydromechanical transmission in a vehicle having a first hydrostatic unit and a second hydrostatic unit comprising steps of:
    determining the displacement of a the first hydrostatic unit when the unit is near a torque dead zone; and
    programming a control unit to first vary the displacement of the first unit and second to vary the displacement of the second unit during a change in vehicle speed wherein the control unit is programmed to fix the displacement of the first unit when the displacement of the second unit is varied; and wherein the displacement of the first unit is fixed at a different position when the vehicle is increasing speed as compared to when the vehicle is decreasing speed.

16. The method of claim 15 wherein the second unit is varied on a different schedule for increasing vehicle speed than for decreasing vehicle speed.

* * * * *